United States Patent [19]

Nakashima

[11] 4,082,427
[45] Apr. 4, 1978

[54] HIGH REFRACTIVE INDEX GLASS COMPOSITIONS

[75] Inventor: Nobuyuki Nakashima, Fukuoka, Japan

[73] Assignee: Fukuoka Tokushu Garasu Kabushiki Kaisha, Japan

[21] Appl. No.: 771,358

[22] Filed: Feb. 23, 1977

Related U.S. Application Data

[63] Continuation of Ser. No. 591,650, Jun. 30, 1975, abandoned.

[30] Foreign Application Priority Data

Jul. 2, 1974 Japan ................................. 49-75658

[51] Int. Cl.$^2$ ........................ C03C 3/12; G02B 5/128
[52] U.S. Cl. ......................................... 350/105; 65/21; 106/47 R; 106/47 Q; 106/52; 428/241; 428/402
[58] Field of Search .................... 106/47 R, 47 Q, 52, 106/54; 350/105

[56] References Cited

U.S. PATENT DOCUMENTS

| | | | |
|---|---|---|---|
| 2,726,161 | 12/1955 | Beck et al. | 106/47 R |
| 2,939,797 | 6/1960 | Rindone | 106/47 R |
| 3,493,403 | 2/1970 | Tung et al. | 106/47 R |
| 3,560,074 | 2/1971 | Searight et al. | 350/105 |
| 3,614,199 | 10/1971 | Altman | 350/105 |
| 3,702,213 | 11/1972 | Schwab | 350/105 |
| 3,934,065 | 1/1976 | Tung | 350/105 |
| 3,946,130 | 3/1976 | Tung et al. | 106/47 R |

*Primary Examiner*—Helen M. McCarthy
*Attorney, Agent, or Firm*—Robert E. Burns; Emmanuel J. Lobato; Bruce L. Adams

[57] ABSTRACT

Disclosed are glass compositions that are particularly suited for making colorless and transparent reflex-reflective glass beads with refractive indices over 2.15. These lead-free glass compositions are made with $TiO_2$ as the main constituent mixed with alkaline earth oxides and alkaline metal oxides, etc.

3 Claims, No Drawings

HIGH REFRACTIVE INDEX GLASS COMPOSITIONS

This is a continuation of application Ser. No. 591,650, filed June 30, 1975, now abandoned.

FIELD OF THE INVENTION

This invention concerns the compositions of high refractive index glass suited for making reflex-reflective glass beads of refractive indices over 2.15.

BACKGROUND OF THE INVENTION

High refractive index glass beads are highly essential material in the manufacture of reflective sheeting used for traffic signs for night traffic safety, vehicle stickers, reflective cloth, reflective paint etc. For road signs erected on high speed highways, reflective sheeting of high brilliance is specially necessary, but in the manufacture of such reflective sheeting of high brilliance, glass beads with high refractive inices are essential. In particular, this invention is for supplying superior quality high refractive index glass that is the source of the glass beads used in high brilliance reflective sheeting.

Since reflective sheeting having high reflective brilliance must maintain its high brilliance even in rainy weather, it is essential that the reflective sheeing have a flat surface. Glass beads are closely packed in a single layer facing the surface within the thin binder (sheet) of transparent synthetic resin (colored or colorless), but said synthetic resin decreases the effectiveness of the glass to act as a spherical lens. Therefore glass beads for high brilliance reflective sheeting requires specially high refractive index glass, for example, for synthetic resin having a refractive index of 1.5 glass with refractive index of about 2.17 and over, and for synthetic resin having a refractive index of 1.45 glass with refractive index of about 2.1 and over, are required.

This invention concerns the compositions of high refractive index glass with refractive indices of over 2.15 for making glass beads of 0.03 to 0.1 m/m diameter that are suited for the manufacture of high brilliance reflective sheeting, with a special feature that PbO is not used in the composition.

Compared to ordinary glass, as unusually high refractive index glass beads for high brilliance reflective sheeting are easily subject to a phenomena of devitrification during the productions stages, special consideration must be given during the production process and also use glass compositions that do not easily cause devitrification. The best means of preventing devitrification during the production process of the glass beads is to chill the beads as rapidly as possible, but there is a limit to that also.

In the past, a high PbO content glass was used for producing glass beads possessing refrative indices of about 2.15 and over that were used for high brilliance reflective sheeting, but from the health standpoint, the use of large amounts of PbO, not only during its manufacturing stages but also in the use of the products, is not desirable.

THE INVENTION

The glass of our invention, containing no PbO whatsoever, is a skillful mixture of high percentage by weight of $TiO_2$ — with a specie of alkaline earth oxide — that has a rather high rate of devitrification, and several kinds of oxides in appropriate amounts to prevent devitrification. For the compositions, $TiO_2$ is used as the main constituent mixed with at least 2 kinds of alkaline earth oxides (BaO, CaO, MgO, SrO) and ZnO and at least one of ($MoO_3$, $ZrO_2$) and at least one kind of alkaline metal oxides ($Na_2O$, $K_2O$, $Li_2O$) as indispensable ingredients. The range of the compositions of this invention is shown as follows in Table 1.

TABLE 1.

| GLASS COMPOSITION PERCENTAGE BY WEIGHT | |
|---|---|
| $TiO_2$ | 55 to 65% |
| BaO | 17 to 30% |
| CaO | 1 to 10% |
| MgO | 0 to 2% |
| SrO | 0 to 6% |
| (However BaO + CaO + MgO + SrO | 18 to 35%) |
| ZnO | 3 to 15% |
| $MoO_3 + ZrO_2$ | 0.2 to 5% |
| $Na_2O + K_2O + Li_2O$ | 0.1 to 0.5% |
| $B_2O_3 + SiO_2 + Al_2O_3 + P_2O_5$ | 0 to 2% |

One of the special feature of the glass of this invention is the fact that by the co-existence of ZnO and a very small amount of alkali metal oxide mixed with $MoO_3$ and or $ZrO_2$, the fusion of high $TiO_2$ content glass is facilitated and devitrification is prevented. Next is an explanation of each ingredient.

DETAILED DESCRIPTION $TiO_2$ which has a melting point of about 1830° C and a refraction index of about 2.53 to 2.71 is the ingredient that contributes mostly to the high refractive index of our glass, but its high concentration increases the rate of devitrification, so for our invention it is preferred to keep the percentage by weight under 65%.

BaO which has a melting point of about 1923° C and a refraction index of about 1.98 contributes to the promotion of the fusibility of our glass, but since it is an ingredient that decreases the refraction index of the glass, 30% is the maximum for our glass.

CaO, having a melting point of about 2570° C and an index of refraction of about 1.84, mixed in small amounts is effective in the prevention of devitrification of our glass, however, if the amount is too great, it accelerates the rate of devitrification instead, so 10% is the maximum for CaO in our glass.

MgO, having a melting point of about 2800° C and an index of refraction of about 1.74, mixed in small quantities is sometimes effective in the prevention of devitrification, but for our glass 2% is the maximum.

SrO, which has a melting point of about 2430° C and an index of refraction of about 1.87, mixed in small amounts is sometimes effective in the prevention of devitrification, but for our glass 6% is the maximum.

ZnO, which has a melting point of about 1975° C and a refraction index of about 2.02, promotes the fusibility of our glass and is effective in the prevention of devitrification, but if the amount is too great, it promotes devitrification, so 15% is considered the limit for ZnO in our glass.

$MoO_3$, which has a melting point of about 795° C and a refraction index of about 2.08, and $ZrO_2$, which has a melting point of about 2700° C and a refraction index of about 2.17, as aforementioned, by the co-existence of ZnO plus a very small amounts of alkali metal oxides, and if their total mixture is within 5%, it is very effective in the prevention of devitrification of our glass. By mixing alkali metal oxides ($Na_2O$, $K_2O$, $Li_2O$) in very small amounts together with ZnO is effective as aforementioned, but 0.5% of alkali metal oxides is considered the limit. Mixture of glass forming oxides ($B_2O_3$, $SiO_2$, Al₂O₃, P₂O₅) in small amounts is effective in some cases for prevention of devitrification of our glass, but 2% of glass-forming oxides is considered the limit. Examples of composition according to this invention are shown in Table 2 with the refractive index (ND) of each resulting glass.

TABLE 2

(Percentage by Weight)

| Example No. | 1 | 2 | 3 | 4 | 5 | 6 | 7 | 8 |
|---|---|---|---|---|---|---|---|---|
| $TiO_2$ | 55.0 | 55.1 | 55.6 | 56.2 | 56.1 | 56.2 | 57.9 | 57.4 |
| BaO | 22.0 | 24.2 | 24.4 | 27.8 | 24.6 | 29.5 | 22.6 | 25.0 |
| CaO | 1.9 | 5.2 | 4.1 | 2.9 | 1.7 | 1.0 | 4.2 | 5.4 |
| MgO | 1.8 | | | | 1.0 | | | |
| SrO | | | 1.8 | 3.5 | 5.9 | | 4.0 | |
| ZnO | 14.6 | 12.2 | 13.4 | 6.0 | 7.0 | 9.2 | 10.5 | 8.5 |
| $MoO_3$ | 2.6 | | 0.2 | 3.5 | | 3.8 | 0.4 | 1.5 |
| $ZrO_2$ | | 3.0 | 0.1 | | 2.4 | 0.2 | | 1.7 |
| $Na_2O$ | | 0.1 | | 0.1 | | 0.1 | | |
| $K_2O$ | 0.1 | | 0.1 | | 0.1 | | 0.1 | |
| $Li_2O$ | | 0.2 | | | | | | 0.3 |
| $B_2O_3$ | | | | | 1.2 | | 0.3 | |
| $SiO_2$ | | | 0.3 | | | | | |
| $Al_2O_3$ | 2.0 | | | | | | | 0.2 |
| nD | 2.15 | 2.15 | 2.15 | 2.16 | 2.15 | 2.17 | 2.16 | 2.16 |

| Example No. | 9 | 10 | 11 | 12 | 13 | 14 | 15 | 16 |
|---|---|---|---|---|---|---|---|---|
| $TiO_2$ | 57.3 | 58.5 | 58.3 | 58.9 | 59.3 | 59.6 | 59.8 | 60.0 |
| BaO | 23.2 | 22.4 | 24.0 | 24.5 | 25.3 | 26.2 | 24.1 | 26.4 |
| CaO | 7.3 | 5.4 | 3.5 | 5.2 | 6.0 | 4.0 | 2.6 | 4.3 |
| MgO | | | 0.5 | | | | 0.8 | |
| SrO | | | 5.0 | | | | | |
| ZnO | 7.0 | 8.8 | 3.2 | 7.2 | 5.3 | 7.7 | 5.7 | 6.5 |
| $MoO_3$ | 1.1 | 4.8 | | 3.5 | 4.0 | 0.3 | 2.5 | 0.1 |
| $ZrO_2$ | 3.7 | | 4.9 | 0.2 | | 0.3 | 2.5 | 2.2 |
| $Na_2O$ | | 0.1 | 0.3 | | 0.1 | 0.1 | 0.5 | |
| $K_2O$ | 0.2 | | 0.2 | 0.5 | | 0.1 | | 0.1 |
| $Li_2O$ | 0.2 | | | | | 0.1 | | 0.1 |
| $B_2O_3$ | | | | | | | 0.1 | 0.1 |
| $SiO_2$ | | | | | | 1.0 | | 0.2 |
| $Al_2O_3$ | | | | | | 0.6 | 1.4 | |
| nD | 2.16 | 2.18 | 2.17 | 2.17 | 2.19 | 2.17 | 2.17 | 2.19 |

| Example No. | 17 | 18 | 19 | 20 | 21 | 22 | 23 | 24 |
|---|---|---|---|---|---|---|---|---|
| $TiO_2$ | 60.0 | 61.6 | 61.5 | 62.5 | 62.1 | 63.3 | 63.4 | 64.7 |
| BaO | 26.3 | 23.5 | 28.9 | 27.0 | 21.0 | 20.2 | 17.5 | 18.5 |
| CaO | 5.6 | 3.0 | 3.3 | 4.7 | 8.5 | 1.2 | 4.5 | 10.0 |
| MgO | 2.0 | | | | 0.2 | | | |
| SrO | | | | | 0.8 | | | 1.0 |
| ZnO | 5.0 | 6.8 | 4.5 | 4.0 | 5.8 | 14.8 | 13.2 | 3.5 |
| $MoO_3$ | 0.7 | 4.5 | 0.5 | 0.2 | 0.8 | 0.1 | 1.0 | 0.2 |
| $ZrO_2$ | 0.2 | 0.1 | 1.0 | 1.5 | 0.7 | 0.2 | 0.3 | 0.1 |
| $Na_2O$ | 0.2 | | | 0.1 | | 0.1 | | 0.1 |
| $K_2O$ | | | 0.3 | | 0.1 | 0.1 | | |
| $Li_2O$ | | 0.5 | | | | | 0.1 | |
| $B_2O_3$ | | | | | | | | |
| $SiO_2$ | | | | | | | | 1.9 |
| $Al_2O_3$ | | | | | | | | |
| nD | 2.19 | 2.18 | 2.20 | 2.21 | 2.21 | 2.20 | 2.21 | 2.19 |

| Example No. | 25 | 26 | 27 | 28 |
|---|---|---|---|---|
| $TiO_2$ | 64.3 | 65.0 | 65.0 | 64.1 |
| BaO | 19.8 | 17.0 | 20.2 | 19.8 |
| CaO | 9.9 | 1.0 | 1.0 | 7.3 |
| MgO | 0.8 | | | |
| SrO | | 0.5 | | |
| ZnO | 3.0 | 11.4 | 8.8 | 5.5 |
| $MoO_3$ | 0.1 | 5.0 | 2.0 | |
| $ZrO_2$ | 0.1 | | 2.6 | 1.1 |
| $Na_2O$ | 0.1 | | | |
| $K_2O$ | | | 0.4 | 0.2 |
| $Li_2O$ | | 0.1 | | |
| $B_2O_3$ | 1.9 | | | |
| $SiO_2$ | | | | |
| $Al_2O_3$ | | | | |
| $P_2O_5$ | | | | 2.0 |
| nD | 2.19 | 2.23 | 2.22 | 2.19 |

The following is an explanation of the sources for materials used in the manufacture of our glass. Each of the materials must be of high purity and must have very little iron content, as iron content causes a brownish coloring in the glass.

For the $TiO_2$ ingredient, titanium oxide is used. For alkali earth oxides; carbonates, nitrates and hydroxides are used. For ZnO, zinc white is used. For $MoO_3$, molybdenum trioxide is used. For alkaline metal oxides, carbonates and nitrates are used. For $B_2O_3$, boric acid is used. For $SiO_2$, powdered silica is used. For $Al_2O_3$, aluminum hydroxide is used. For $P_2O_5$, calcium phosphate is used.

In the manufacture of our glass, the batch (mixture of ingredients) is placed in an alumina or platinum crucible and turned into a molten state by heating at approximately 1400° C. A greater $TiO_2$ content in the glass tends to require higher temperatures. Care must be exercised so that the reducing flame does not come into contact with the glass, as it would cause brownish coloring in the glass. Fusion is completed in less time than for ordinary soda glass and the fused glass has a low viscosity.

Pour the molten glass immediately into cold water and comminute by this sudden chilling. This operation not only makes the pulverization of the glass convenient, but also prevents devitrification, however care must be exercised to have the entire glass melt chilled as quickly as possible.

To make the glass beads, the small pieces of glass comminuted by sudden chilling are dried, pulverized and screened to the prescribed size of powdered glass to prepare beads of 0.03 - 0.1 mm. Then by methods well known to the art, the particles are heated while suspended in air at a temperature of 1300° C to 1500° C, and each powdered glass particle becomes a spheriod by surface tension in a short time. In order to prevent devitrification, the glass particle that has become spherical must be rapidly cooled. Also during the process of making the glass particles into spheroids, reducing flame must not come into contact with the glass particles, as it would cause a brownish coloring the glass. In this way, superior quality glass beads which are colorless and transparent, and with high index of refraction can be obtained.

What is claimed is:

1. Lead-free colorless and transparent glass suitable for formation at 1300° – 1500° C of colorless, transparent glass, beads having a refractive index exceeding 2.15 for use in reflex-reflective articles, and whose composition by weight percentage is:

| | % Range | Combined Range |
|---|---|---|
| $TiO_2$ | 55 – 65 | |
| BaO | 17 – 30 | |
| CaO | 1 – 10 | |
| MgO | 0 – 2 | 18 – 35% |
| SrO | 0 – 6 | |
| ZnO | 3 – 15 | |
| $MoO_3$ | 0 – 5 | 0.2 – 5% |
| $ZrO_2$ | 0 – 5 | |
| $Na_2O$ | 0 – 0.5 | |
| $K_2O$ | 0 – 0.5 | 0.1 – 0.5% |
| $Li_2O$ | 0 – 0.5 | |
| $B_2O_3$ | 0 – 2 | |
| $SiO_2$ | 0 – 2 | less than 2% |
| $Al_2O_3$ | 0 – 2 | |
| $P_2O_5$ | 0 – 2 | |

2. The process for preparing lead-free spherical glass beads of refractive index exceeding 2.15 which comprises the steps of forming a melt of glass having the composition according to claim 1; quenching said melt in a cold liquid medium; comminuting said glass into particles in the size range of 0.03 to 0.1 mm; suspending said particles in an air stream; heating said suspended particles to 1300° – 1500° C until softened whereby the surface tension of the softened glass converts said particles to spheroidal beads; rapidly cooling and collecting said beads.

3. Reflective articles comprising a support coated with a matrix film comprising a transparent resin polymer, said matrix film including a layer of the glass beads of refractive index greater than 2.15 according to claim 2.

* * * * *